(12) United States Patent
Wolf (10) Patent No.: US 6,359,347 B1
(45) Date of Patent: Mar. 19, 2002

(54) SIPHON HYDROELECTRIC GENERATOR

(76) Inventor: Arthur M. Wolf, 11 Graymoor La., Olympia Fields, IL (US) 60461

( * ) Notice: Subject to any disclaimer, the term of this patent is extended or adjusted under 35 U.S.C. 154(b) by 0 days.

(21) Appl. No.: 09/476,198

(22) Filed: Jan. 3, 2000

(51) Int. Cl.[7] .................. F03B 13/00; H02P 9/04
(52) U.S. Cl. ................. 290/54; 290/43; 290/53
(58) Field of Search ..................... 290/53, 54

(56) References Cited

U.S. PATENT DOCUMENTS

| | | | |
|---|---|---|---|
| 938,078 A | 10/1909 | Roed ............... | 290/53 |
| 1,597,664 A | 8/1926 | Allen ............... | 290/53 |
| 2,105,624 A | 1/1938 | Orlove ............. | 60/55 |
| 2,855,860 A | 10/1958 | Crump ............. | 103/236 |
| 3,391,903 A | 7/1968 | Peterson, Jr. | |
| 3,487,228 A | 12/1969 | Kriegel ........... | 290/52 |
| 3,754,147 A * | 8/1973 | Hancock et al. ... | 290/53 |
| 3,970,859 A | 7/1976 | Riem ............... | 290/54 |
| 4,132,901 A | 1/1979 | Crausbay .......... | 290/53 |
| 4,180,976 A | 1/1980 | Bunn ............... | 60/325 |
| 4,258,269 A * | 3/1981 | Tsubota ............ | 290/53 |
| 4,282,444 A | 8/1981 | Ramer ............. | 290/52 |
| 4,443,707 A | 4/1984 | Scieri et al. ....... | 290/4 R |
| 4,508,971 A * | 4/1985 | Bailey ............. | 290/1 R |
| 4,514,977 A | 5/1985 | Bowen | |
| 4,660,379 A | 4/1987 | Lane | |
| 4,691,115 A | 9/1987 | Robinson .......... | 290/1 R |
| 4,698,516 A | 10/1987 | Thompson ........ | 290/54 |
| 4,739,182 A | 4/1988 | Kenderi ........... | 290/54 |
| 4,845,376 A * | 7/1989 | Bendiks ........... | 290/54 |
| 5,377,485 A | 1/1995 | Bellamy ........... | 60/398 |
| 5,905,312 A | 5/1999 | Liou ................ | 290/54 |

FOREIGN PATENT DOCUMENTS

| | | | |
|---|---|---|---|
| DE | 44 04 803 A1 | 8/1994 | |
| FR | 994039 | 11/1951 | |
| GB | 759910 | 10/1956 | |
| GB | 2238832 | 6/1991 | |
| JP | 56-92362 | 7/1981 | |
| SU | 1523-706 | 10/1987 | ......... F03B/13/12 |

OTHER PUBLICATIONS

No author Norwegian Wave–Energy is Already Economic Oct. 20, 1977 Elektro (Norway) vol. 90, No. 18.

* cited by examiner

*Primary Examiner*—Elvin Enad
(74) *Attorney, Agent, or Firm*—Leydig, Voit & Mayer, Ltd.

(57) ABSTRACT

A method and apparatus for generating hydroelectric power from a water source by lifting water from a relatively lower position to a second relatively raised position. The water is moved in a generally upward direction stepwise from a lowermost tier to an uppermost tier in a plurality of stacked tiers. The water from the water source is initially upwardly siphoned to the lowermost tier. The water from the lower tier is then upwardly siphoned to a next adjacent higher tier. The water from the uppermost tier is channeled down to turn a turbine driven generator to produce electrical power.

12 Claims, 6 Drawing Sheets

SIPHON HYDROELECTRIC GENERATOR

FIELD OF THE INVENTION

The present invention generally relates to a system and a method for generating hydroelectric power. More particularly, it relates to a system and a method of lifting water from a water source from a relatively lower position to a relatively raise position utilizing siphonic action and channeling the water from the relatively raised position down to a turbine driven generator.

BACKGROUND OF THE INVENTION

Increases in population and technological advancements have created an unprecedented demand for new sources of energy. The use of traditional sources of energy such as coal and oil are resulting in the gradual depletion of natural resources as well as the release of harmful pollutants into the environment. The use of nuclear energy carries multiple risks including those associated with the disposal of nuclear waste byproducts. Alternative sources such as solar power and wind power have not proven to be reliable sources of energy.

Hydroelectric energy is a safer and a more cost effective form of energy. Hydroelectric power generally involves the use of falling water to drive turbines which in turn drive generators to generate electricity. While conventional hydroelectric power generation has typically depended on the availability of running water, many prior art systems have attempted to employ static water as a source to generate hydroelectric power.

One such prior art system, is disclosed in UK Patent Application GB 2 238 832 A. The prior art system disclosed raises water via a plurality of tanks and channels the water down to drive a generator. Each of the water tanks is positioned in increasingly elevated positions on individual base stands. A pipe extends from a box structure submerged below a water source to the first water tank. The pipe includes a descending portion below the water surface and a water lifting portion which rises steeply from below the water source up into the first water tank. A branch pipe extends from the descending portion of the pipe. An air compressor is connected to the free end of the branch pipe. The air compressor is used to initialize the flow velocity of the water through the pipe. In addition, if the flow of water through the pipe slows down, the air compressor is operated to increase the flow velocity of the water to the desired velocity. Similar pipes are provided between the other water tanks to successively raise the water from tank to tank. Each of these pipes includes a descending portion extending from the source water tank and a water lifting portion for lifting the water into the next higher water tank. Air compressors are connected to the branch portions of the pipes and operated to initialize the flow velocity of water through the pipes. The air compressors are then operated on a periodic basis to maintain the flow velocity of the water through the pipes. The water collected in the highest water tank is channeled down to a power generator turbine. A pump can also be provided in each pipe for accelerating the flow of water through the water lifting portion of the pipes.

Another prior art system, disclosed in U.S. Pat. No. 2,855,860, consists generally of a number of cascaded water tanks and a plurality of siphon pipes. Each siphon pipe generally consists of an inlet tube, a horizontal pipe section and a lower leg pipe section. The inlet tube of the first siphon pipe has a lower end submerged in a fluid source and an upper end which extends through the first water tank. The inlet tube is in fluid connection with the horizontal pipe extending horizontally above the water tank. The lower level leg pipe has an upper end connected to the end of the horizontal pipe and a lower end connected to a vacuum source. The vacuum source is used to initiate the flow of water through the siphon pipe. In addition, a quantity of air is injected into the siphon pipe so that more water flows into the siphon tube than flows out of the siphon tube. The extra volume of water in the siphon tube is diverted to and captured in the first tank. Similar siphon pipes are used to raise water to successively higher water tanks. At each level, the extra volume of water in the siphon pipe is captured in the water tanks. Pre-designated fluid levels are maintained in each of the water tanks.

Each of these prior art systems include complex valves and compressed air drive fluids to promote or sustain siphoning and siphoning flow rates. Compressed air systems are notoriously difficult to monitor and maintain. Pressurized lines and couplings tend to wear out or to leak and have to replaced often. To overcome the shortcomings of the prior art devices, a new and improved water lifting system based on siphoning which does not require the use of compressed air drive fluids is desired.

Accordingly, it is an object of the present invention to provide a new and improved apparatus for lifting water or other fluids based on siphons.

It is another object of the invention to provide a method and system for lifting water which further employs the raised water to generate highly efficient, clean and low cost hydroelectric energy,

SUMMARY OF THE INVENTION

In accordance with these and other objects, the present invention provides, in an embodiment, a new and improved apparatus and method for lifting water or other fluid from a first relatively lower position to a second relatively raised position. More particularly, the new and improved method of lifting a fluid from a relatively lower position to a second relatively raised position involves the steps of moving fluid in a generally upward direction stepwise from a lowermost tier to an uppermost tier in a plurality of stacked tiers. The fluid from the fluid source is initially upwardly siphoned to the lowermost tier. The fluid from the lower tier is then upwardly siphoned to a next adjacent higher tier.

The method of lifting water may include siphoning fluid from a fluid source to a receiving vessel in the lowermost tier. The fluid in the receiving vessel may be collected into a staging vessel. The fluid in the staging vessel may then be siphoned into a receiving vessel in an upper tier and then collected from the receiving vessel in the upper tier into a staging vessel in the same tier.

The method of lifting fluid may further include the step of initiating the siphoning of the fluid from the fluid source. The method may also include initiating siphoning of fluid into a receiving vessel in an upper tier from a staging vessel in a lower tier. The pressure in the receiving vessels may be slightly reduced for a selected period of time to initiate the siphoning flow. Alternatively, the receiving vessels and the staging vessels may be filled with fluid to desired starting fill levels.

A transfer conduit extending from a bottom of each receiving vessel to the bottom of each staging vessel in the same tier may be provided. The rate of flow of fluid from the receiving vessel into the staging vessel may be selectively variably controlled.

The method of lifting water may further include submerging the lower source end of the source siphon conduit in the fluid source and discharging the fluid from the fluid source into the receiving vessel in the lowermost tier via the source siphon conduit. The fluid entering the inlet opening of the source siphon conduit may be filtered.

The transfer siphon conduit may include an upper discharge opening and a lower inlet opening. The upper discharge opening may be positioned in fluid communication with the receiving vessel in the next upper tier and the lower inlet opening may be submerged in the fluid present in the staging vessel disposed in the next adjacent lower tier.

The liquid level in the receiving vessel and the liquid level in the staging vessel in the same tier may be maintained at a selected liquid level differential. The liquid level in the receiving vessel and in the staging vessel may be monitored.

The new and improved apparatus for lifting water from a relatively lower position to a second relatively raised position includes a plurality of tiers including a lowermost tier and at least one upper tier, a source siphon conduit and at least one transfer siphon conduit. Each tier includes a receiving vessel and a staging vessel. The receiving vessel is in fluid communication with a staging vessel. The source siphon conduit siphons fluid from a fluid source into the receiving vessel disposed in the lowermost tier. The transfer siphon conduit functions to siphon fluid into a receiving vessel in an upper tier from a staging vessel in the next adjacent lower tier.

The apparatus may include a means for commencing the siphoning flow through the source siphon conduit and the transfer siphon conduit. At least one vacuum or evacuation pump may used to initially slightly reduce the pressure in the receiving vessel for a selected period of time to initiate the flow through the siphon conduits.

A transfer conduit extending from the bottom end of the receiving vessel to the bottom end of the adjacent staging vessel may be used to provide the fluid connection between the vessels. A one-way flow valve may be provided in the transfer conduit to ensure that the fluid flows from the receiving vessel into the staging vessel. A means may be included to selectively variably control the rate of flow of fluid from the receiving vessel into the staging vessel.

The source siphon conduit and the transfer siphon conduit may each include a lifting leg portion and a relatively longer angled arm portion cantilevered from the lifting leg portion. The lifting leg portion may terminate in an inlet opening while the angled arm portion may terminate in a discharge opening. The inlet opening of the source siphon conduit may be submerged in the fluid source while the discharge opening may be placed in fluid communication with the receiving vessel in the lowermost tier. A filter may be used to filter the fluid entering the inlet opening of the source siphon conduit. The upper discharge opening of the transfer siphon conduit may be placed in fluid communication with the receiving vessel in an upper tier while the lower inlet opening may be submerged in the fluid present in the staging vessel in the next adjacent lower tier.

A means may be provided for filling the receiving vessels and the staging vessels to desired starting fill levels. Each of the receiving vessels and each of the staging vessels may be provided with a liquid level sensor for sensing the liquid level in each respective vessel. A controller may be used to maintain a selected liquid level differential between the liquid level in the receiving vessel and the liquid level in the staging vessel in each tier. The receiving vessels used may be airtight vessels.

DETAILED DESCRIPTION OF THE PREFERRED EMBODIMENTS

Figure 1:
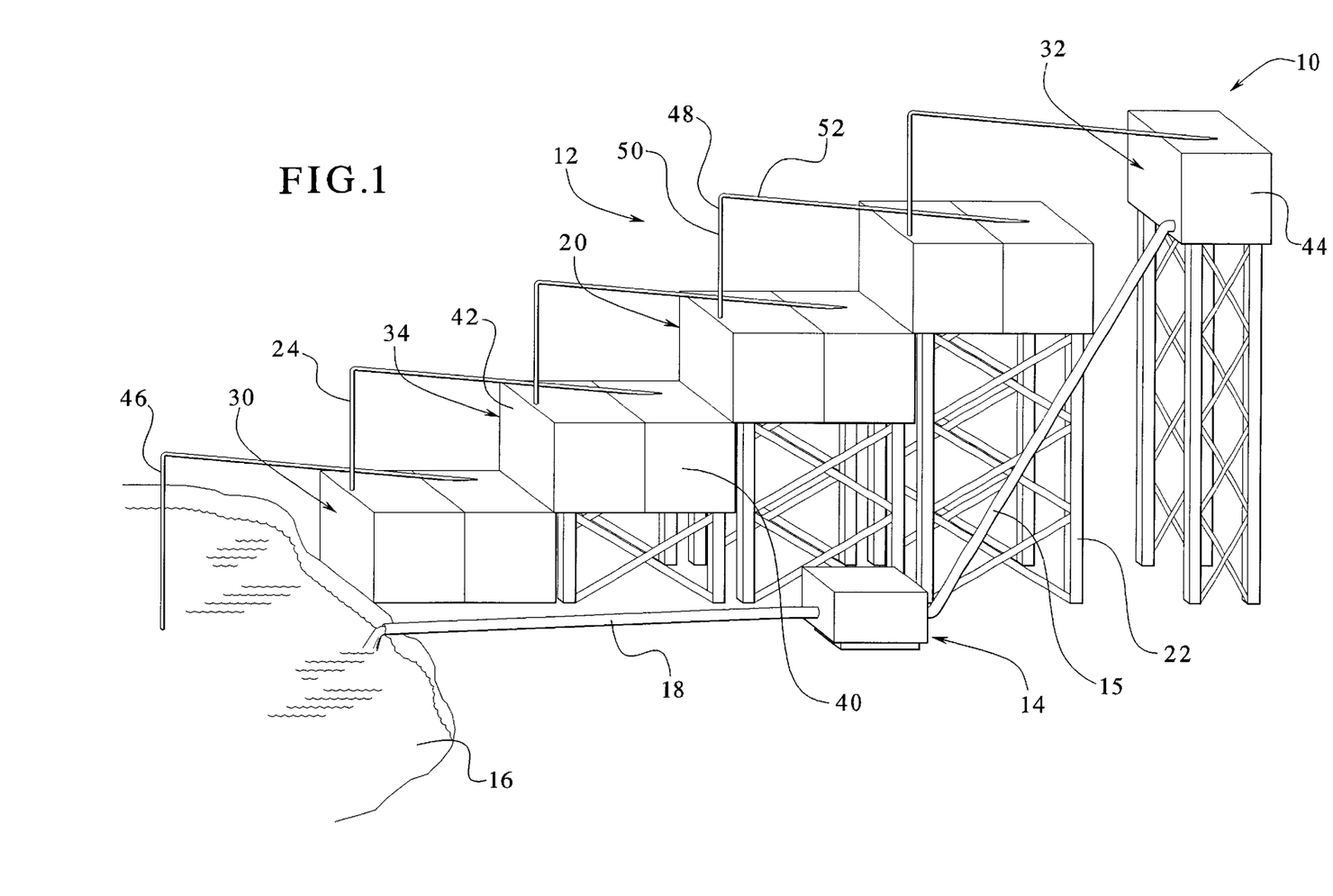
FIG. 1 is a perspective view of a new and improved siphon hydroelectric generator in accordance with a preferred embodiment of the present invention.
Figure 2:
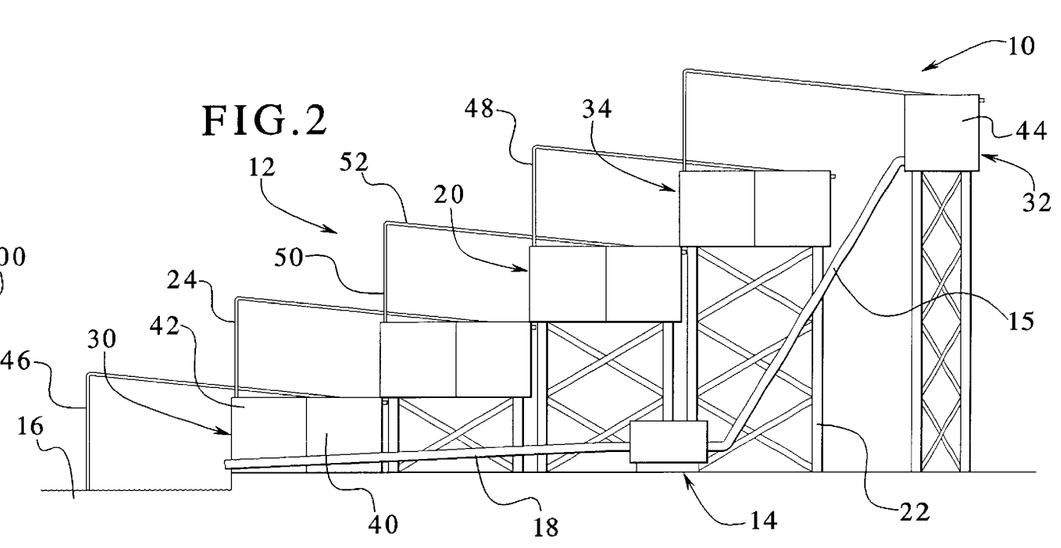
FIG. 2 is an elevated side view of the siphon hydroelectric generator of FIG. 1.
Figure 3:
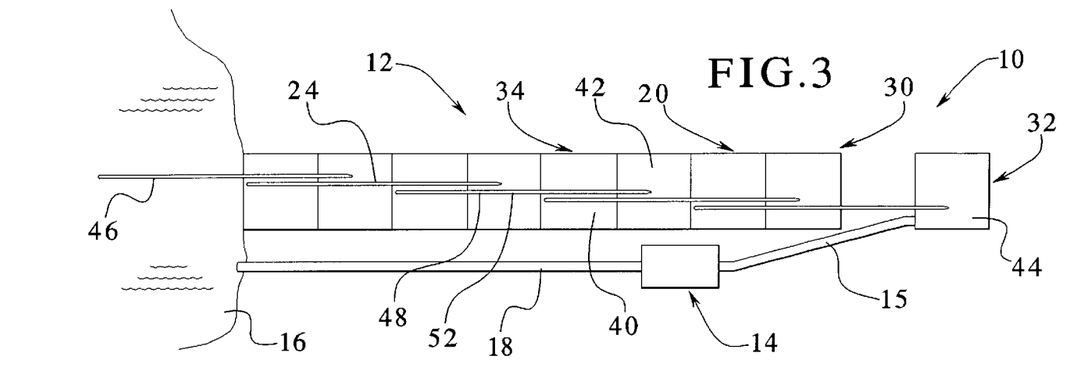
FIG. 3 is a top plan view of the siphon hydroelectric generator of FIG. 1.

Referring now to FIGS. 1, 2 and 3, a preferred embodiment of a new and improved siphon hydroelectric generator in accordance with the principles of the present invention is generally designated as 10. Siphon hydroelectric generator 10 generally includes a water lifting unit 12 and a power generation unit 14. Water lifting unit 12 lifts water from a water source 16, such as for example a reservoir. The water is then channeled via a discharge conduit 15 from a raised position down to power generation unit 14 which produces electrical power. The water discharged by power generation unit 14 is returned to water source 16 via a return conduit 18.

Water lifting unit 12 generally includes a plurality of stacked tiers of vessels 20, support structures 22 for supporting the tiers of vessels 20 and a number of siphon conduits 24. Stacked tiers 20 include a lowermost tier 30, an uppermost tier 32 and a number of intermediate tiers 34. Although three intermediate tiers 34 are shown in FIGS. 1–3, a fewer number of or a greater number of intermediate tiers 34 may be used without departing from the spirit of the invention.

Lowermost tier 30 and each of the intermediate tiers 34 of water lifting unit 12 includes a receiving vessel 40 and a staging vessel 42. In a preferred embodiment, both receiving vessels 40 and staging vessels 42 are airtight vessels. Receiving vessel 40 in each tier 20 is in one-way fluid communication with adjacent staging vessel 42 in the same tier 20 such that water can only flow from receiving vessel 40 to staging vessel 42. The water from a lower adjacent tier 20 is collected into receiving vessel 40. The water collected in receiving vessel 40 is channeled to adjacent staging vessel 42. The water in staging vessel 42 is then siphoned into receiving vessel 40 disposed in the next adjacent higher tier 20. Uppermost tier 32 includes only an uppermost receiving vessel 44.

In a preferred embodiment of the invention, each of the receiving vessels 40 are generally airtight and are generally cube shaped. Receiving vessels 40 and staging vessels 42 having height, width and length dimensions of approximately ten feet each. Receiving vessels 40 and staging vessels 42 are preferably constructed from a reinforced concrete, coated concrete or engineering polymer materials. Receiving vessels and staging vessels having alternative shapes, such as for example circular vessels, or alternative height, width and length dimensions may be used without departing from the spirit of the invention.

Support structures 22 are used to support receiving vessels 40 and staging vessels 42 in each successive tier 20 in increasingly elevated positions. In a preferred embodiment, support structures 22 are constructed from steel, however, support structures constructed from other materials, such as for example wood or engineering polymers, are also considered to be within the scope of the invention.

The siphon conduits 24 include a source siphon conduit 46 and a number of transfer siphon conduits 48. Source siphon conduit 46 is used to siphon water from water source 16 to receiving vessel 40 in lowermost tier 20. Transfer siphon conduits 48 are used to siphon water from staging vessel 42 in lower tier 20 to receiving vessel 40 in the next adjacent higher tier 20 stepwise through successive intermediate tiers 34 to uppermost tier 32.

Source siphon conduit 46 and transfer siphon conduits 48 are similar in construction. Source siphon conduit 46 and each of the transfer siphon conduits 48 include a lifting leg portion 50 and an angled lateral leg portion 52 cantilevered from lifting leg portion 50. The length of angled lateral leg portion 52 is preferably twice the length of lifting leg portion 50. In an especially preferred embodiment, the length of lifting leg portion 50 is approximately eighteen feet while the length of angled lateral leg portion 52 is approximately thirty-six feet. In a preferred embodiment, the angle θ between lifting leg portion 50 and angled lateral leg portion 52 is less than 90 degrees. The diameters of source siphon conduit 46 and transfer siphon conduits 48 should be designed such that the total volume of water siphoned by water lifting unit 12 is equal to the total volume of water flowing out of discharge conduit 15. Source siphon conduit 46 and transfer siphon conduits 48 are preferably constructed from a non-corrosive metal, such as for example stainless steel, however other materials apparent to one skilled in the art, such as polyvinyl chloride (PVC) pipe or other engineering polymer tubing, may be used without departing from the spirit of the invention.

In a preferred embodiment, each of the receiving vessels 40 include a port 56 for connection to an evacuation pump (not shown). A suction force is typically employed to slightly reduce the pressure within the each of the receiving vessels 40 to initiate the flow of water through source siphon conduit 46 and through transfer siphon conduits 48. Port 56 can be placed in one of two states, a normally closed state or an open state. During the initialization process, port 56 is placed in an open state and the pump is operated to create a suction force which removes a slightly volume of air from each of the receiving vessels 40. The removal of the volume of air results in slightly a reduction of pressure within each of the receiving vessels 40. The reduced pressure condition within each of the receiving vessels 40 initiates the flow of water through source siphon conduit 46 and transfer siphon conduit 48. Additionally, in the event external factors, such as for example the infiltration of gases into source siphon conduit 46 or transfer siphon conduit 48, should interrupt the siphonic flow, the vacuum or evacuation pump may be operated to reestablish a stable siphonic flow.

While a vacuum or evacuation pump is used in the preferred embodiments of the present invention, other mechanisms for initiating or maintaining siphonic flow apparent to one skilled the art are also considered to be within the scope of the invention.

Figure 4:
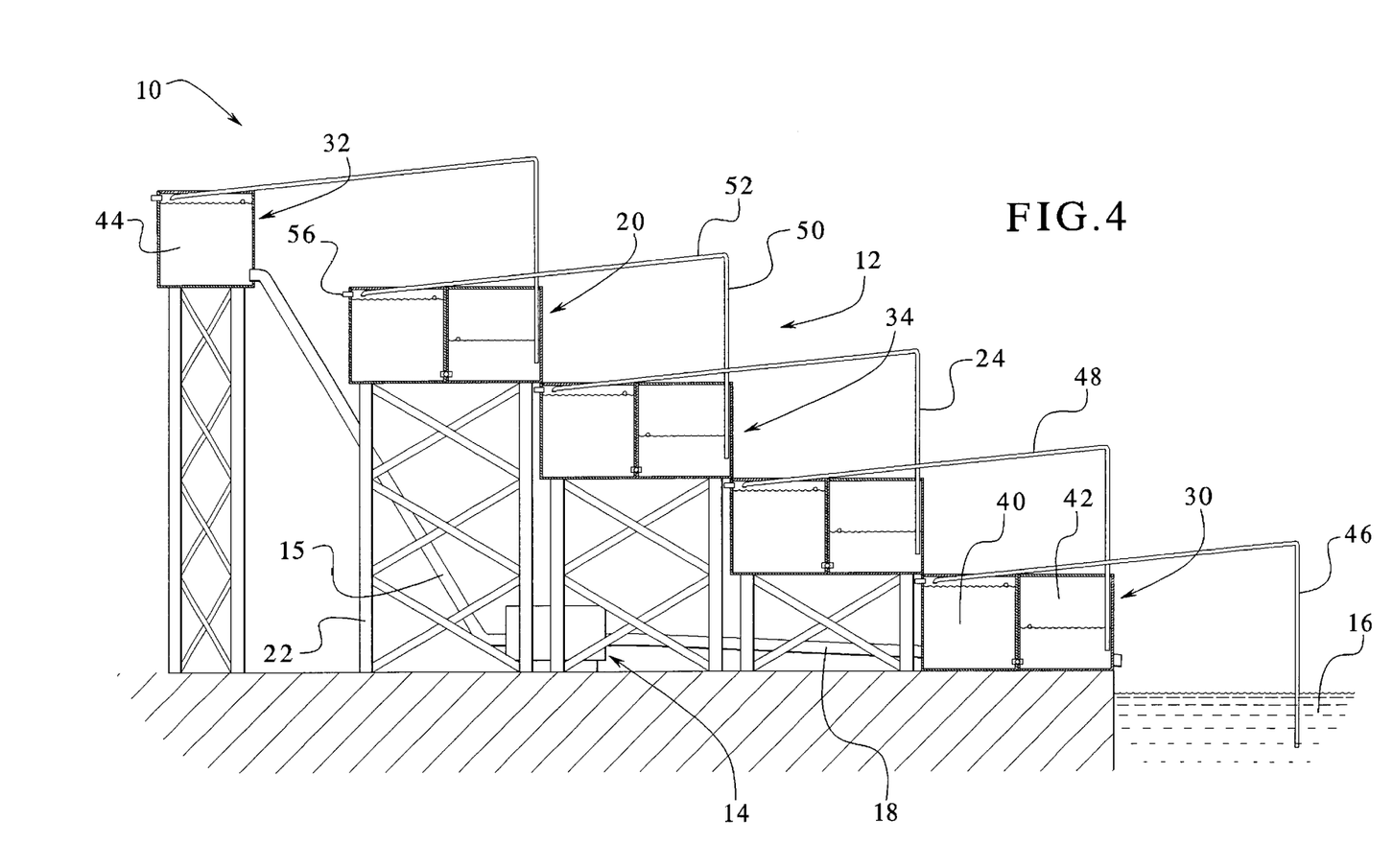
FIG. 4 is an elevated cross-sectional side view of the siphon hydroelectric generator of FIG. 1.
Figure 5:
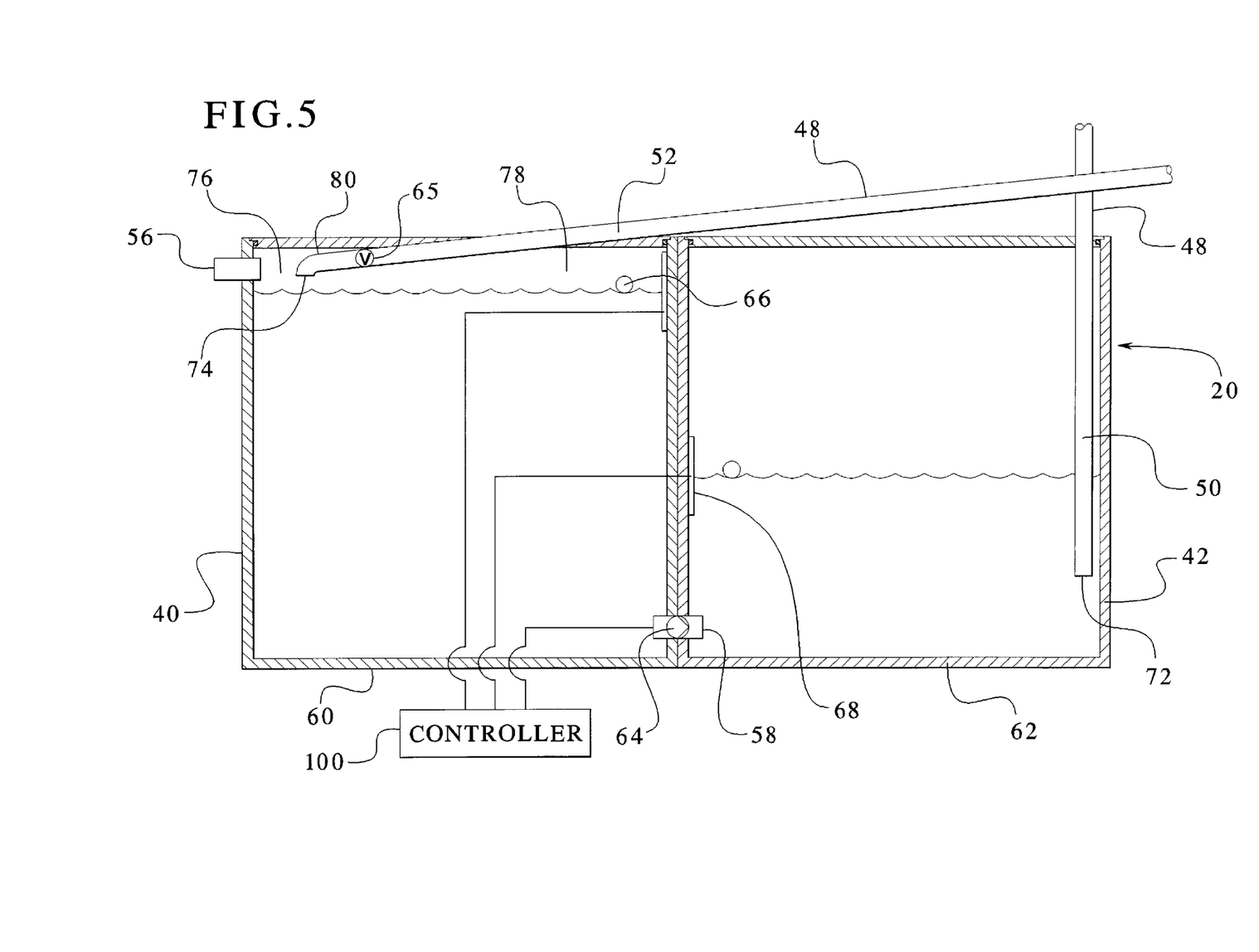
FIG. 5 is an elevated cross-sectional side view of a single tier of the siphon hydroelectric generator of FIG. 1.

Referring now to FIGS. 4 and 5, an elevated cross-sectional side view of siphon hydroelectric generator 10 and an elevated cross-sectional side view of a single tier 20 of siphon hydroelectric generator 10 are shown. Fluid connection is provided from receiving vessel 40 to adjacent staging vessel 42 in each tier 20 via a transfer conduit 58. Transfer conduit 58 extends from the bottom end 60 of receiving vessel 40 to the bottom end 62 of staging vessel 42 such that transfer conduit 58 is disposed below the selected liquid levels in each vessel. A one-way variable flow valve 64 is disposed in transfer conduit 58. The one-way variable flow valve permits the flow of water from receiving vessel 40 to adjacent staging vessel 42 while blocking the back flow of water from staging vessel 42 to receiving vessel 40. In a preferred embodiment, a controller 100 (FIG. 5) monitors the flow of water through the one-way variable flow valve.

In an alternative embodiment, multiple one-way variable flow valves 64 may be provided between receiving vessel 40 and adjacent staging vessel 42. In the event the controller detects a malfunction in the operation of one of the one-way variable flow valves 64, the controller increases the flow of water through alternative one-way variable control flow valves 64. The use of multiple one-way variable flow valves 64 ensures that the operation of the entire siphon hydroelectric generator 10 need not be shut down in response the failure of a single one-way variable flow valve 64.

In a preferred embodiment, a shut off valve 65 is provided in each of the source siphon conduits 46 and transfer siphon conduit 48. Shut off valve 65 is in a normally open state to permit the siphonic flow of water and can be placed in a closed state to interrupt the siphonic flow of water into receiving vessel 40. The flow through transfer siphon conduit 48 or any of the individual transfer siphon conduits 48 can manipulated via the associated shut off valve 65. The controller may be used to control the status of each of the individual shut off valves 65.

A selected liquid level differential is maintained between the liquid level in each receiving vessel 40 and the liquid level in adjacent staging vessel 42. The differential liquid level causes water to flow from each of the receiving vessels 40 into adjacent staging vessels 42 via one-way variable flow valves 64 within transfer conduits 58. In a preferred embodiment of the present invention, the liquid level height in each receiving vessel 40 is maintained at approximately twice the liquid level height in adjacent staging vessel 42.

The controller is used to regulate the liquid levels in each of the receiving vessels 40 and each of the staging vessels 42. Liquid level sensors 66, 68 are provided in each of the receiving vessels 40 and each of the staging vessels 42. The controller continuously monitors the liquid levels via input signals provided by liquid level sensors 66, 68. In the event the liquid level sensors 66, 68 detect a discrepancy in the liquid level of one of the receiving vessels 40 or one of the staging vessels 42, the controller initiates a correction process to adjust the liquid levels back to the pre-designated levels.

In another embodiment of the invention, multiple liquid level sensors 66, 68 may be provided in each of the receiving vessels 40 and each of the staging vessels 42. The use of multiple sensors 66, 68 provides redundancy so that the liquid level sensing function in receiving vessel 40 or staging vessel 42 is not lost as a result of a single liquid level sensor failure.

As mentioned previously, each of the transfer siphon conduits 48 includes a lifting leg portion 50 and a relatively longer arm portion 52 cantilevered from lifting leg portion 50. Lifting leg portion 50 terminates in an inlet opening 72. The inlet opening 72 of each of the transfer siphon conduits 48 is submerged in the water contained in each of the staging vessels 42. Arm portion 52 terminates a discharge opening 76. Discharge opening 76 is disposed in the air space 78 above the water level in each of the receiving vessels 40.

Source siphon conduit 46 is similar in form to transfer siphon conduit 48 in that source siphon conduit 46 also includes a lifting leg portion 50 terminating in an inlet opening 72. Inlet opening 72 is designed to be submerged in water source 16. In the preferred embodiment, a filter is provided at the inlet opening to filter the water siphoned by source siphon conduit 46. Arm portion 52 of source siphon conduit 46 also terminates in a discharge opening 76. Discharge opening 76 is disposed in the air space 78 above the water level in receiving vessel 40 in lowermost tier 20.

Figure 6:
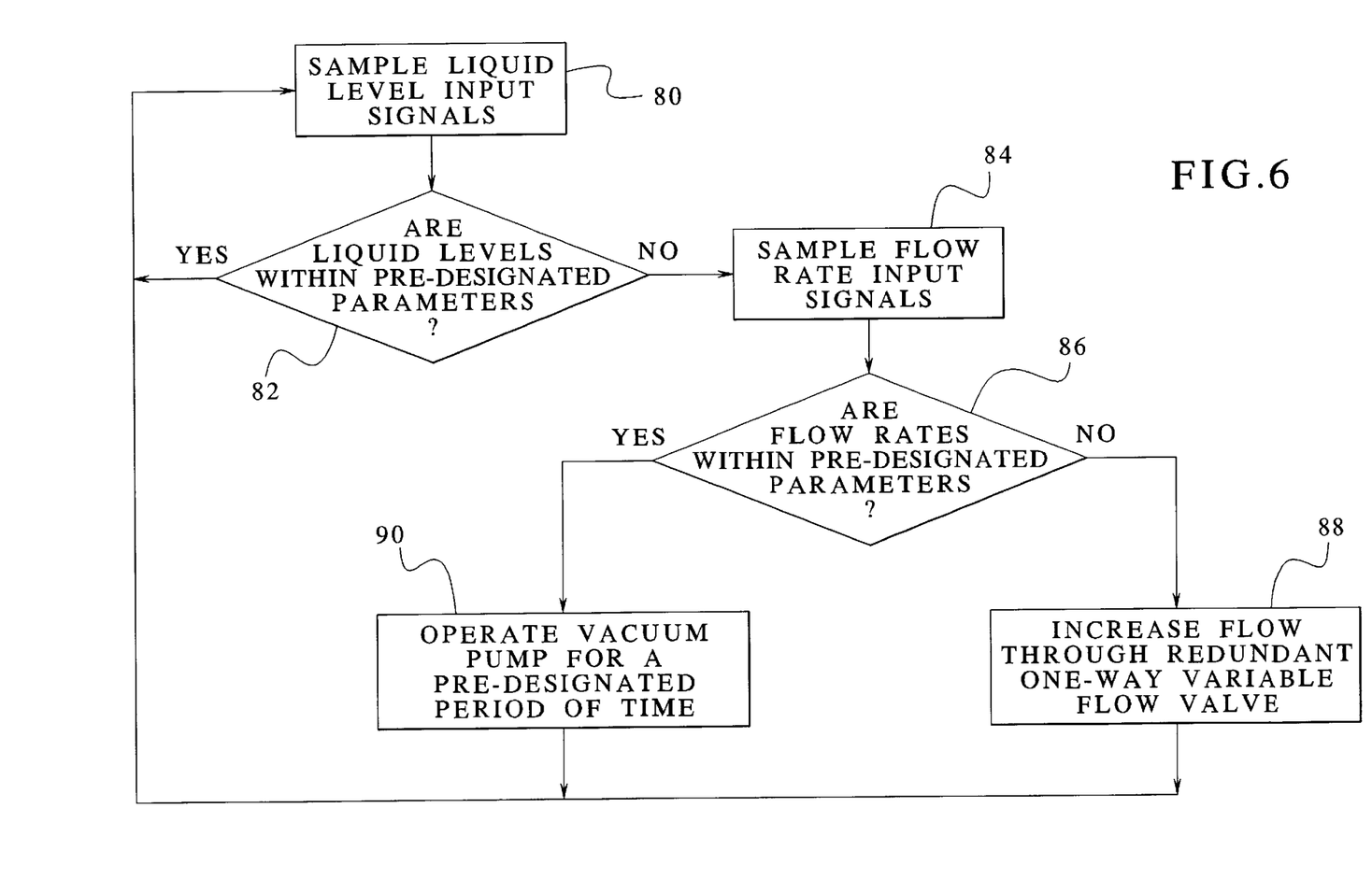
FIG. 6 is a flow chart outlining the operation of a controller for regulating the operation of the siphon hydroelectric generator of FIG. 1.

Referring now to FIG. 6, a flow chart outlining the operation of the controller is shown. The controller primarily functions to monitor and maintain pre-designated liquid levels in each of the receiving vessels 40 and each of the staging vessels 42. In the preferred embodiment of the present invention, the controller periodically samples input signals 80 representative of the liquid levels in the each of the receiving vessels 40 and each of the staging vessels 42. The liquid level readings are generated by liquid level sensors 66, 68. The controller compares the liquid level input signals to pre-designated liquid level parameters to determine if there is a discrepancy in the liquid levels 82. If all of the liquid levels within each of the receiving vessels 40 and each of the staging vessels 42 are within the pre-designated parameters, the controller takes no action and continuous to monitor the liquid levels. If a liquid levels is found to be outside the pre-designated liquid level parameters, the controller samples the flow rate input signals 84.

The flow rate input signals are representative of the individual flow rates through each of the one-way variable flow valves 64. The flow rate input signals are based on readings obtained from the flow rate sensors in each of the one-way variable flow valves 64. The controller compares the flow rate input signals to pre-designated parameters 86 representative of an optimum range of flow rates to maintain the siphonic flow of water. If a flow rate input signal for a particular one-way variable flow valve 64 is found to be outside the pre-designated parameters, the controller increases the flow through the redundant one-way variable flow valve 88 so that the flow rate required to maintained the necessary liquid level differential between receiving vessel 40 and adjacent staging vessel 42 is reestablished.

If the controller determines that all of the flow rates for all of the one-way variable flow valves 64 are within the pre-designated parameters, it is assumed that an external factor, such as for example the infiltration of gas into source siphon conduit 46 or a transfer siphon conduit, has interrupted the siphonic flow of water. The controller initiates the operation of the evacuation pump for a pre-designated time 90. The operation of the pump slightly reduces the air pressure within each of the receiving vessels 40. The reduction of air pressure within each of the receiving vessels 40 causes a reduced pressure to be present at discharge openings 76 relative to inlet openings 72 of source siphon conduit 48 and each of the transfer siphon conduits 46. This facilitates the flow of water through source siphon conduit 48 and transfer siphon conduit 46 until the siphonic flow of water is reestablished.

Prior to operation of siphon hydroelectric generator 10, receiving vessels 40 and staging vessels 42 are filled with water to starting fill levels. In the preferred embodiment, receiving vessels 40 are filled to a height of approximately eight feet and staging vessels 42 are filled to a height of approximately four feet. The water may be drawn up into receiving vessels 40 and staging vessels 42 from water source 16 via source siphon conduit 46 and transfer siphon conduits 48 by running the evacuation pump at port 56. The operation of the evacuation pump slightly reduces the air pressure within each of the receiving vessels 40 such that the discharge opening 76 of source siphon conduit 46 and each of the transfer siphon conduits 48 are placed at a lower pressure relative to the corresponding inlet opening 72.

In an alternative embodiment, the water may be directly channeled into each of the receiving vessels 40 and each of the staging vessels 42 from water source 16 via independent fill conduits (not shown) for each of the receiving vessels 40 and each of the staging vessels 42 using fill pumps (also not shown).

Once the start fill levels have been established within each of the receiving vessels 40 and each of the staging vessels 42, the or evacuation pump is started to initiate the flow of water through source siphon conduit 46 and through transfer siphon conduits 48. Once a steady state flow is achieved, the vacuum pump is turned off.

During steady state operation of siphon hydroelectric generator 10, water is initially siphoned via source siphon conduit 46 from water source 16 into receiving vessel 40 in lowermost tier 30. The relatively higher water level in receiving vessel 40 causes the water to flow into adjacent staging vessel 42 with a relatively lower water level via the transfer conduit 58. The water in the staging vessel 42 is siphoned upward via transfer siphon conduit 48 into receiving vessel 40 in the next adjacent higher tier. The water then flows from receiving vessel 40 into adjacent staging vessel 42 in the same tier. This process continues and the water from water source 16 is continuously siphoned upward into receiving vessel 40 in the uppermost tier 32.

The water flowing into the uppermost tier 32 is directed downward to power generation unit 14 via the discharge conduit 15. Power generation unit 14 includes a turbine and a generator as is known to one skilled in the art. The flowing water turns the turbine which in turn drives the generator which produces electricity. Water lifted to approximately one hundred feet and then discharged flume or via a discharge conduit having a diameter of approximately one foot may be used to generate electricity.

Figure 7:
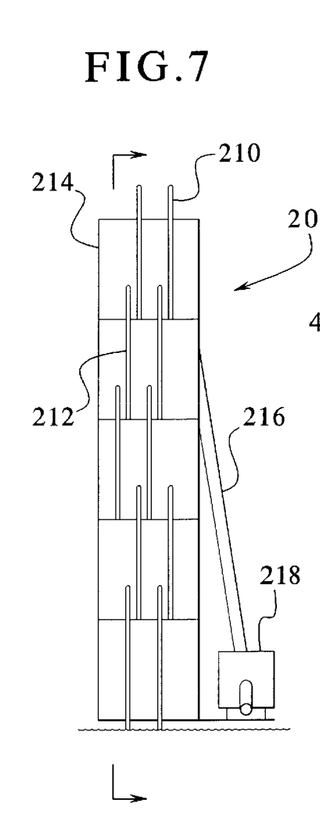
FIG. 7 is a front plan view of an alternate embodiment of a new and improved siphon hydroelectric generator having multiple siphon conduits feeding each adjacent higher tier in accordance with the principles of the present invention.

FIG. 7 is a front plan view of an alternate embodiment of a new and improved siphon hydroelectric generator 200 in accordance with the principles of the present invention. Siphon hydroelectric generator 200 has multiple source siphon conduits 210 and multiple transfer siphon conduits 212 feeding each adjacent higher tier. The use of multiple source siphon conduits 210 and multiple transfer siphon conduits 212 increases the flow rate of the water siphoned to the uppermost tier 214. As a result, larger volumes of water can be lifted and channeled via the discharge conduit 216 to the turbine driven generator 218. Larger volumes of water can be used to drive larger generators thereby increasing the amount of energy produced.

Figure 8:
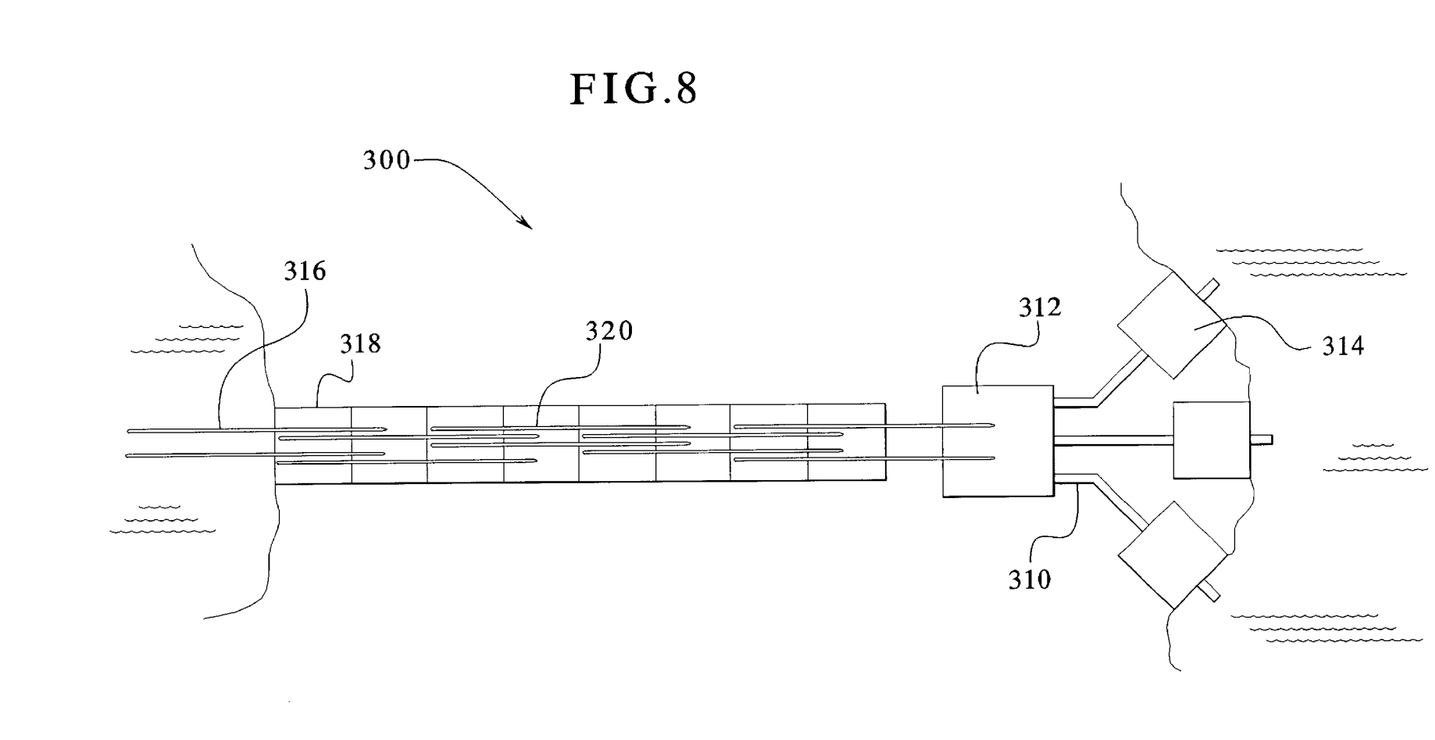
FIG. 8 is a top plan view of an alternate embodiment of a new and improved siphon hydroelectric generator having multiple discharge conduits for channeling the water collected in the uppermost tier to multiple generators.

FIG. 8 is a top plan view of an alternate embodiment of a new and improved siphon hydroelectric generator 300 having multiple discharge conduits 310 for channeling the water collected in the uppermost tier 312 to multiple generators 314. Multiple source siphon conduits 316 are used to siphon a volume of water to the lowermost tier 318. Multiple transfer siphon conduits 320 are then employed to siphon the water stepwise to the uppermost tier 312. The use of multiple source siphon conduits 316 and multiple transfer siphon conduits 320 permit large volumes of water to be lifted. The water collected in one or more uppermost tiers 312 may then discharged using multiple discharge conduits to drive a plurality of generators 314.

While the invention has been described with specific embodiments, other alternatives, modifications and variations will be apparent to those skilled in the art. Accordingly, it is intended to include all such alternatives, modifications and variations set forth within the spirit and scope of the appended claims.

I claim:

1. An apparatus for lifting a fluid from a first relatively lower position to second relatively raised position, said apparatus comprising:

a plurality of tiers including a lowermost tier, at least one intermediate tier disposed above the lowermost tier and an uppermost tier disposed above the intermediate tier, the lowermost tier including at least one pair of vessels including a receiving vessel and a staging vessel, the receiving vessel in each pair being fluidly connected to the staging vessel by a bottom end transfer conduit extending from a bottom end of the receiving vessel to a bottom end of the staging vessel, each bottom end transfer conduit including means for selectively variably controlling a rate of flow of a fluid from the receiving vessel into the staging vessel, the intermediate tier including at least one pair of vessels including a receiving vessel and a staging vessel, the receiving vessel in each pair being fluidly connected to the staging vessel by a bottom end transfer conduit extending from a bottom end of the receiving vessel to a bottom end of the staging vessel, each bottom end transfer conduit including means for selectively variably controlling a rate of flow of a fluid from the receiving vessel into the staging vessel, the uppermost tier including a receiving vessel;

a plurality of siphon conduits, each siphon conduit including a generally vertical lifting leg portion having a lower inlet opening and a relatively longer downwardly angled lateral leg portion cantilevered from a top of the lifting leg portion, the lateral leg portion being longer than the lifting leg portion and having an end discharge opening, a first of the siphon conduits positioned so that its lower inlet opening is submerged in a constant fluid source and its end discharge opening is disposed in the first tier receiving vessel; others of the siphon conduits being positioned so that their inlet openings are submerged in fluid present in a staging vessel of a next adjacent lower tier and their respective discharge openings are disposed in a receiving vessel;

means for filling the receiving vessels and staging vessels present in each of the tiers with a fluid to desired starting fill levels; and means for commencing siphoning flow through the siphoning conduits so that fluid taken in from the constant fluid source is raised to the first tier receiving vessel, flows from the receiving vessel into the first tier staging vessel and thereafter is successively raised by siphoning from the lowermost tier through the at least one intermediate tiers to the receiving vessel of the uppermost tier to thereby raise the fluid to a relatively raised position with respect to the constant fluid source.

2. The apparatus of claim 1 comprising more than one said transfer siphon conduit to siphon fluid from each of said lowermost and intermediate tiers.

3. The apparatus of claim 1 comprising more than one said discharge conduit.

4. The apparatus of claim 1 wherein said means for commencing siphoning flow includes at least one pump for initially reducing the pressure in the receiving vessels for a selected period of time.

5. The apparatus of claim 1, further comprising a valve in said bottom end transfer conduit which operates to permit one-way flow from the receiving vessel to the staging vessel on the same tier.

6. The apparatus of claim 1 further including a controller for maintaining a selected liquid level differential between a liquid level in the receiving vessel and a liquid level in the staging vessel in each tier.

7. The apparatus of claim 1 further including a liquid level sensor in each receiving vessel for sensing a liquid level in the receiving vessel.

8. The apparatus of claim 1 further including a liquid level sensor in each staging vessel for sensing a liquid level in the staging vessel.

9. The apparatus of claim 1 wherein each receiving vessel is airtight.

10. The apparatus of claim 1 wherein each staging vessel is airtight.

11. The apparatus of claim 1 further including a filter for filtering fluid entering at least one of said siphon conduits.

12. The apparatus of claim 1 further comprising a discharge conduit for directing the flow of fluid from the staging vessel in the uppermost tier to a generator disposed below the uppermost tier.

* * * * *